(12) United States Patent
Johnson et al.

(10) Patent No.: US 6,418,434 B1
(45) Date of Patent: Jul. 9, 2002

(54) TWO STAGE AUTOMATED ELECTRONIC MESSAGING SYSTEM

(75) Inventors: David E. Johnson, Cortlandt Manor, NY (US); Pnina Vortman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,872

(22) Filed: Jun. 25, 1999

(51) Int. Cl.$^7$ .............................................. G06F 17/30
(52) U.S. Cl. .................... 707/5; 707/6; 704/2
(58) Field of Search .............. 707/1–7; 704/2

(56) References Cited

U.S. PATENT DOCUMENTS

| | | | | |
|---|---|---|---|---|
| 5,384,703 A | * | 1/1995 | Withgott et al. | 364/419.19 |
| 5,867,799 A | * | 2/1999 | Lang et al. | 707/1 |
| 5,924,090 A | * | 7/1999 | Krellenstein | 707/5 |
| 5,940,624 A | * | 8/1999 | Kadashevich et al. | 395/759 |
| 5,963,940 A | * | 10/1999 | Liddy et al. | 707/5 |
| 6,029,192 A | * | 2/2000 | Hill et al. | 709/206 |
| 6,078,924 A | * | 6/2000 | Ainsbury et al. | 707/101 |
| 6,101,503 A | * | 8/2000 | Cooper et al. | 707/104 |
| 6,128,613 A | * | 10/2000 | Wong et al. | 707/7 |
| 6,161,130 A | * | 12/2000 | Horvitz et al. | 709/206 |
| 6,182,068 B1 | * | 1/2001 | Culliss | 707/5 |
| 6,233,575 B1 | * | 5/2001 | Agrawal et al. | 707/6 |
| 6,240,424 B1 | * | 5/2001 | Hirata | 707/104 |
| 6,308,176 B1 | * | 10/2001 | Bagshaw | 707/10 |

* cited by examiner

*Primary Examiner*—James P. Trammell
*Assistant Examiner*—Mary Wang
(74) *Attorney, Agent, or Firm*—McGuireWoods LLP; Stephen C. Kaufman

(57) ABSTRACT

A two stage electronic messaging system and method of use that automatically and accurately responds to user queries (e.g., input documents) using a two stage searching and retrieval system. The two stages system includes fast document-matching techniques (e.g., "weak" search techniques) in combination with more advanced categorization and text-search techniques (e.g., machine learning and other semi-automated techniques). The two stage searching and retrieval system may be used via the Internet, an intranet, LAN or other similar system, and may be used for providing requested information to a user (e.g., customer, employee, customer representative and the like) via a content rich web site, a propriety database or any computer related help system.

43 Claims, 6 Drawing Sheets

| $c_1$ | $c_2$ | $c_3$ | $c_4$ | $c_5$ |
|---|---|---|---|---|
| 1 | 1 | 1 | 1 | 1 |
| 2 | 2 | 2 |   | 2 |
| 3 | 3 | 3 |   | 3 |
| 4 |   | 4 |   | 4 |
| 5 |   |   |   | 5 |

FIG. 6

TWO STAGE AUTOMATED ELECTRONIC MESSAGING SYSTEM

BACKGROUND OF THE INVENTION

1. Field of the Invention

The present invention generally relates to an electronic messaging system and method of use and, more particularly, to an electronic messaging system that automatically and accurately responds to user queries (e.g., input documents) using a two stage searching and retrieval system.

2. Background Description

Electronic commerce (e.g., the electronic sale of products and customer services relating to those products) over the Internet and more importantly the World Wide Web (WWW) portion of the Internet is becoming increasingly more important to a business' viability and economic health. However, in order to effectively conduct business over the Internet or any other electronic means it is imperative that the user (e.g., customers) have easy access to the information that is available through the Internet (or other electronic means), and in particular, product and service information contained in a content rich web site sponsored by a particular entity (such as, for example, a company, business, institution and the like). It is equally important that the user have access to the required information via a proprietary database accessed via an intranet, LAN, single use computer, or other similar system.

In order to be an active and competitive participant in the field of electronic commerce, it is critical that the business be responsive to electronic user queries, as well as providing pertinent information in response to those queries, via the content rich web site (or off-line help desk). This provides an avenue for the user to obtain timely information about services and products offered by the business of concern, and further provides a cost efficient method for the entity to disseminate such information to the user.

There are several means of providing pertinent information in response to user queries, such as electronic mail (email), frequently asked question (FAQ) databases and on-line/off-line help desks. These methods permit the user to become more familiar with the company or entity it is doing business with, and thus more comfortable with purchasing products and/or services and/or requesting information over the Internet or other electronic means from the business. This, in turn, may translate into increased traffic on the web site (e.g., the customer again revisiting the web site) or proprietary database (or other electronic system) which is instrumental in increasing revenue growth of the business via its electronic commerce activities. This same interaction also provides a valuable service to the entity of concern by allowing the business or other entity to better serve its customers in a more cost efficient manner.

It is also important to note that such systems may also be instrumental in assisting employees of a company or institution in obtaining internal and/or confidential information that would otherwise be difficult or time consuming to obtain, and which is not accessible to the general public. This information may be accessed via an intranet, LAN or other similar system, and would allow employees to readily obtain information that may be needed in the performance of their employment. By way of example, a customer representative may need to access a help-desk database in order to assist a customer regarding a certain topic.

When using email, the user simply requests certain information and forwards that information via electronic means to the business entity or other concerned party. To this end, businesses, for example, receive and generate many electronic messages in the course of their commerce and activities, which are routed, via a mail system (e.g., server), to a specific individual or individuals, or a general inquiry center. Once the specific individual or individuals receive the message, it is opened, read, and an appropriate action is taken, such as, for example, forwarding the message to another individual, responding to the message or performing countless other actions, and the like. Typically, this is a time consuming and inefficient use of resources and, in many instances, does not adequately address the user's query in a timely manner.

For example, in large institutions, such as banks, electronic messages are routed to the institution generally, and not to any specific individual. In these instances, several individuals may have the sole function of opening and reading the incoming messages, and to properly route the messages so that, for example, an appropriate action by a qualified specialist can be performed on the message. As can be imagined, this is very time consuming and inefficient, especially when messages need expert attention in several divergent fields.

A more time efficient but less accurate manner of responding to a user's query is to provide a FAQ database which allows the user to query the database for certain information. In these "auto-response" systems, the user asks a general or specific question and a "weak" search engine performs, for example, a keyword matching or nearest neighbor determination, to return a list of potentially relevant documents (responses or answers). However, these searching techniques do not make definite decisions regarding whether a document or answer is relevant to the user query, or present the answers in a manner that is intuitive to the user. Accordingly, the user is typically required to search through a possibly large set of documents in order to find the appropriate answer to the user query. This is especially true when the database of answer documents is large, and such nearest neighbor or other similar known search technologies return a large set of potentially relevant documents or answers.

The FAQ database is a simple and cost efficient means for providing responses to user queries. It is also easy to maintain and update, simply by adding more answers to the database. However, as discussed above, the database becomes less accurate when more answers are placed in the database. Another compromise in the use of FAQ databases is the fact that a large number of responses may be returned, but none of which are responsive to the customer query. This is a result of the "weak" search engine used by the FAQ databases. Thus, although there is a low barrier to entry, some users may become frustrated by (i) the many returned responses that must be read prior to obtaining a correct answer or (ii) not receiving a response that is responsive to the user's query.

An off-line help desk is another way of disseminating information to a user. In this case, the user calls via telephone or requests via email (or other electronic means) certain information which is then routed to an operator. The operator then queries a database of answers in order to appropriately answer the user's query. This may be performed in the same manner as a FAQ database, to wit a "weak" search engine which performs, for example, a keyword matching or nearest neighbor determination. However, the off-line help desk may instead use machine learning techniques which require sample training data. While more accurate than weaker search techniques, current machine learning techniques, alone, suffer from the fact that they are costly to develop and maintain and have a low performance speed.

It is desirable, however, to have an electronic response system that effectively and efficiently responds to a user's query. This includes providing timely and accurate responses to the user query without the assistance of a qualified specialist or other individual having to read and respond to the incoming message.

In order to effectively and efficiently respond to a user's query, a two stage messaging system is required. This system would preferably combine a "weak" search engine with a machine learning technique in order to respond to the user's query in an accurately and timely manner. This two stage messaging system would be cost efficient, easy to maintain, and provide a high speed and accurate response system. The general applications would include email systems and any database that may potentially be queried, and would preferably include, at least, classification and categorization of natural language documents and automated electronic data transmission processing and routing.

SUMMARY OF THE INVENTION

The present invention is directed to a two stage electronic messaging system and method of use that automatically and accurately responds to user queries (e.g., input documents) using a two stage searching and retrieval system. In order to accomplish the objectives of the present invention, fast document-matching techniques (e.g., "weak" search techniques) in combination with more advanced categorization and text-search techniques (e.g., machine learning and other semi-automated techniques) are provided. The two stage searching and retrieval system of the present may be used via the Internet, an intranet, local area network (LAN) or other similar system, and may be used for providing requested information to a user (e.g., customer, employee, customer representative and the like) via a content rich web site, a propriety database or any computer related help system.

More specifically, a user inputs document data which is received by a machine-learning based categorizer. The categorizer first classifies the input document in terms of categories which effectively narrows the possible relevant responses. The categorizer may also assign confidence levels associated with the categories assigned to the input document. By way of example only, the categorizer may analyze the incoming text, which may include tokenization of the text, morphological analysis of the text, or other known text processing techniques in order to establish one or more categories.

Once the specified categories are established, a second search using weaker similarity matching technology (e.g., an example based response generator), then searches the restricted, more focused parts of the entire dataset. The dataset of responses is grouped according to a set of predetermined categories and, optionally, may include confidence levels. The example based response generator may provide simple search techniques, such as, similarity matching techniques, keyword searching or other known searching techniques that do not need to be trained on data.

By using the example based response generator of the present invention, integrating and adding further information to the database without the need for training on data is easily obtained. This added information may, however, later be used to train on so that the more advanced search techniques may utilize this information and provide more accurate category information.

The example based response generator may also provide a "score" or "rank" associated with the response retrieved from the specified categories. This "score" or "rank" may assist the user in more easily and accurately finding the most appropriate response to the input document by ranking in importance the response. The categories may also be ranked according to a predetermined ranking scheme.

Once the categories and responses are selected, they may be displayed on a display in accordance with the confidence levels and ranks, in descending or ascending order. Thus, if a category or response does not meet or exceed a threshold level, for example, the category and the response will not be displayed (e.g., if the confidence level of the input document does not meet or exceed the confidence level of the categorized response, then it may not be displayed). Also, in the embodiments of the present invention, the categories and responses may be listed according to the confidence levels and ranks.

Thus, the technique of the present invention increases the odds of finding correct and responsive answers to the user's query (or input document).

BRIEF DESCRIPTION OF THE DRAWINGS

The foregoing and other objects, aspects and advantages will be better understood from the following detailed description of a preferred embodiment of the invention with reference to the drawings, in which:

FIG. 6 shows a hierarchical database for use with the present invention.

DETAILED DESCRIPTION OF A PREFERRED EMBODIMENT OF THE INVENTION

Figure 1:
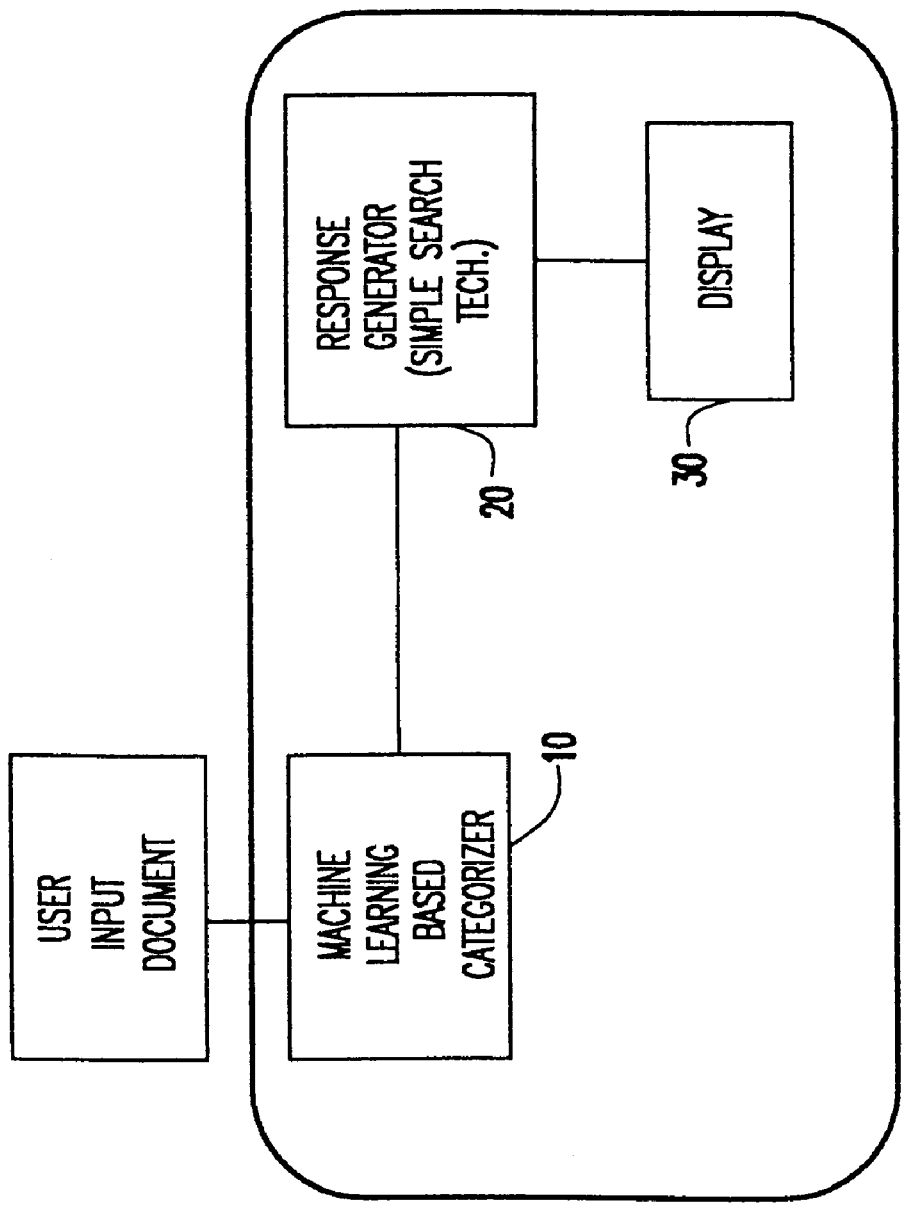
FIG. 1 is a block diagram of the general layout of the two stage automated electronic messaging system of the present invention.

The present invention is directed to a two stage electronic messaging system and method of use and more specifically, an electronic messaging system that automatically and accurately responds to user queries (e.g., input documents) using a two stage searching and retrieval system. In order to accomplish the objectives of the present invention, fast document-matching techniques (e.g., "weak" search techniques) in combination with more advanced categorization and text-search techniques (e.g., machine learning and other semi-automated techniques) are provided. This approach solves the development and maintenance problem by using machine learning and other semi-automated techniques, while accurately and timely responding to the user's request.

More specifically, the two stage searching and retrieval system of the present may be used via the Internet, an intranet, LAN or other similar system, and may be used for providing requested information to a user (e.g., customer, employee, customer representative and the like) via a content rich web site, a propriety database or any computer related help system. The approach of the present invention embodies a "divide and conquer" strategy for providing "answers" in response to the user requested information (input document). That is, the system of the present invention uses a machine-learning based categorizer to first assign categories and, optionally, associated confidence levels to the input document. In the second stage, fast search technology techniques (e.g., nearest neighbor, keyword search) search a database of responses only within the specified categories which, in embodiments, exceed a given confidence level of the response categories. Thus, by first classifying the responses in terms of stable, higher level, categories (using a machine-learning based categorizer), a second search using weaker similarity matching technology, for example, can be restricted to searching smaller, more focused parts of the entire dataset. This technique of the present invention thus increases the odds of finding correct and responsive answers to the user's query (or input document), and further providing a more narrow set of responses to the user.

It is well understood that the system and method of the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

System of the Present Invention

Referring now to the drawings, and more particularly to FIG. 1, there is shown a block diagram of the general layout of the present invention. In order to perfect the present invention, a user (e.g., customer) sends an electronic message (hereinafter referred to as an "input document") via the Internet, intranet, LAN and the like to an individual or institution. It is obvious to one skilled in the art that the Internet, intranet, LAN and the like are not critical to the understanding of the present invention, and a discussion of these features is thus omitted herein.

In the preferred embodiment, a machine-learning based categorizer 10 receives the input document and classifies "it" (potential responses to the input document) into categories and, in embodiments, associated confidence levels. The categorizer 10 practices advanced categorization and text-search techniques such as those described in co-pending U.S. patent application Ser. No. 09/176,322, incorporated herein by reference in its entirety.

By way of example only, in one embodiment of the present invention, the categorizer 10 analyzes the incoming input document, which may include tokenization of the text, morphological analysis of the text, or other well known text processing techniques in order to establish one or more categories. The categorizer 10 is created by training on a set of sample preclassified documents, this involves a number of steps include preparing, training on and testing a set of preclassified documents. Data preparation typically involves obtaining a corpus of pre-classified data and training involves training a classifier (e.g., machine learning algorithm) on a corpus of pre-classified data. Testing includes testing the classifier with some subset of the pre-classified data set aside for this purpose.

The process of generating training vectors of the present invention can be divided into three steps, which are strictly illustrative of one example of the present invention. Accordingly, other known processes for generating training vectors can work equally well with the present invention. As one example of generating training vectors, the categorizer 10 of the present invention provides:

1. Feature definition: Typically this involves breaking the text up into tokens. Tokens can then be reduced to their stems or combined to multi-word terms.
2. Feature count: Typically this involves counting the frequencies of tokens in the input texts. Tokens can be counted by their absolute frequency, and several relative frequencies (relativized to the document length, the most frequent token, square root, etc.).
3. Feature selection: This step includes weighting features (e.g., depending on the part of the input text they occur in: title vs. body), filtering features depending on how distinctive they are for texts of a certain class (filtering can be done by stop word list, based on in-class vs. out-class frequency etc.).

Once the specified category or categories are established, an example based response generator 20 searches a response database (or other database) only within the specified categories which, in embodiments, exceed a given confidence level. The example based response generator 20, searching only the specified categories, then provides an accurate response to the input document.

Still referring to FIG. 1, the example based response generator 20 provides simple search techniques, such as, for example, similarity matching techniques, keyword searching or other known searching techniques that do not need to be trained on data. In order to implement the example based response generator 20, one merely specifies example requests leading to a particular response which permits one to develop responses for cases for which there are few examples, and to easily update responses and add new ones.

Although these simple search techniques are much less accurate than machine learning techniques, when used in combination with the advanced learning techniques they provide very accurate responses to the input document. One of the advantageous discoveries of the present invention results from having these simple search techniques only searching a smaller, more focused part of the entire dataset (which was established by the more advanced search techniques). This increases the odds of finding correct answers in response to the input document, and further provides a smaller subgroup of responses to the user in response to the input document.

Also, by using the example based response generator 20 of the present invention, integrating and adding further information to the database without the need for training on the data is easily obtained (since the example based response generator 20 is able to query and find the newly added information in the database using simple search techniques). This added information may, however, later be used to train on (with additional information) so that the more advanced search techniques may utilize this information and provide more accurate category information. Thus, the combination of the more advanced and simple searching techniques in one system provides a more accurate, efficient and easily manageable system.

In the embodiments of the present invention, it is well understood that the simple search techniques do not need to train on data and may be used even if no specified categories are identified by the more advanced searching techniques. However, it is important to note that the more advanced searching techniques should at least attempt to categorize the data; although, it is realized that this may not always be possible since the advanced search techniques may not have any sample data to train on during the use of the present invention.

It is also understood that the example based response generator may also provide a "score" or "rank" associated with the response retrieved from the specified categories. This "score" or "rank" may assist the user in more easily and accurately finding the most appropriate response to the input document by ranking in importance the response. The "score" or "rank" may be, for example, (i) based on the number of word or stem matches, (ii) based on the weighting of a particular important word, phrase or nearest neighbor distance measure (e.g., Euclidean distance), (iii) normalized depending on the document length, or (iv) any other well known weighting or ranking methods. In further embodiments, the categories may also be ranked according to a predetermined ranking scheme.

Referring still to FIG. 1, once the categories are selected and the simple search techniques obtain the appropriate responses, a display 30 may then display the responses. It is noted that the display may display several categories and specific responses associated with the categories, or only one category with one or more responses, or any combination thereof. The specific responses or categories may be ranked by "score" so that a higher "score" represents a more accurate response to the requested information. The present invention may also display only those categories that meet or exceed a certain predetermined threshold confidence level. However, the present invention is not limited to the above examples and may simply provide the most accurate response or equally list all responses that are found by the simple search techniques. Other variations of displaying and/or ranking either the responses and/or categories are also contemplated for use by the present invention.

Method of Use of the Present Invention

Figure 2:
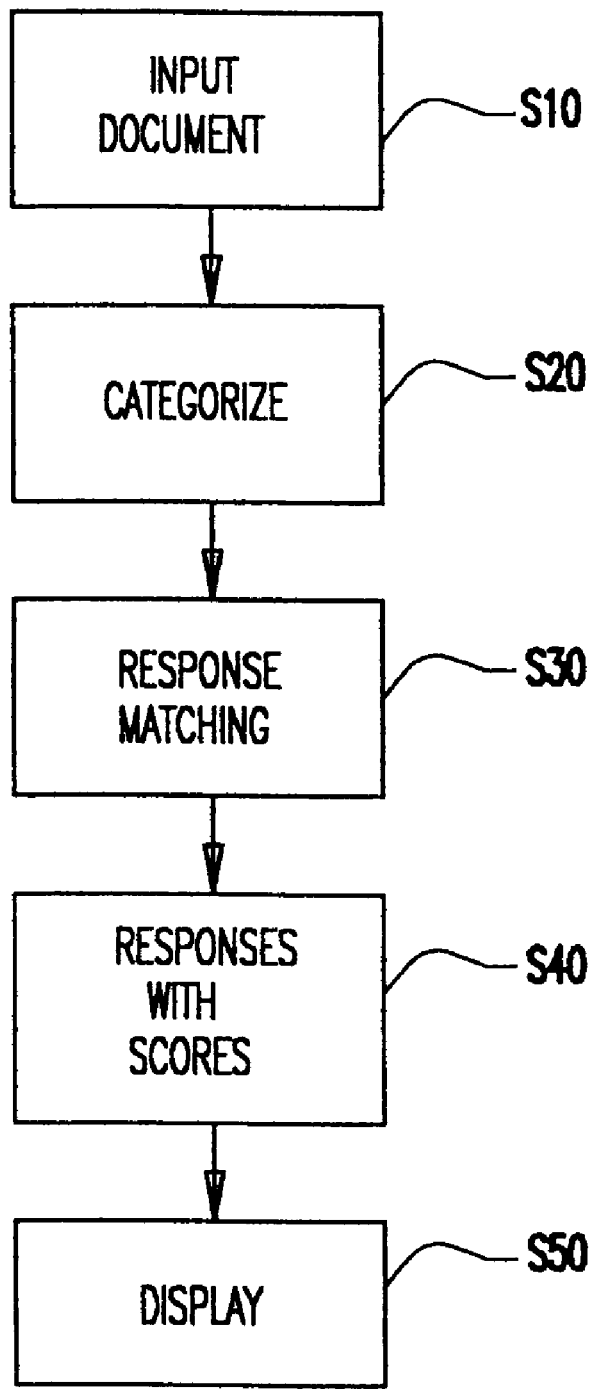
FIG. 2 is a flow diagram showing the steps of implementing the two stage automated electronic messaging system of the present invention.
Figure 3:
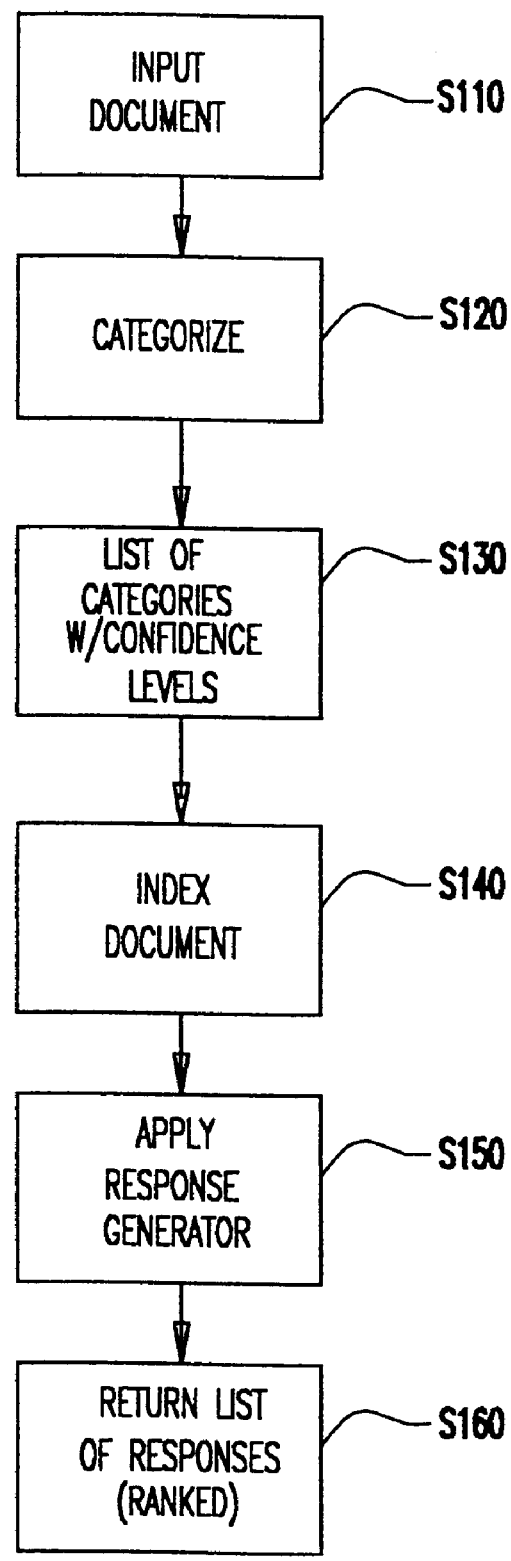
FIG. 3 is a flow diagram of an embodiment showing further steps of implementing the two stage automated electronic messaging system of the present invention.
Figure 4:
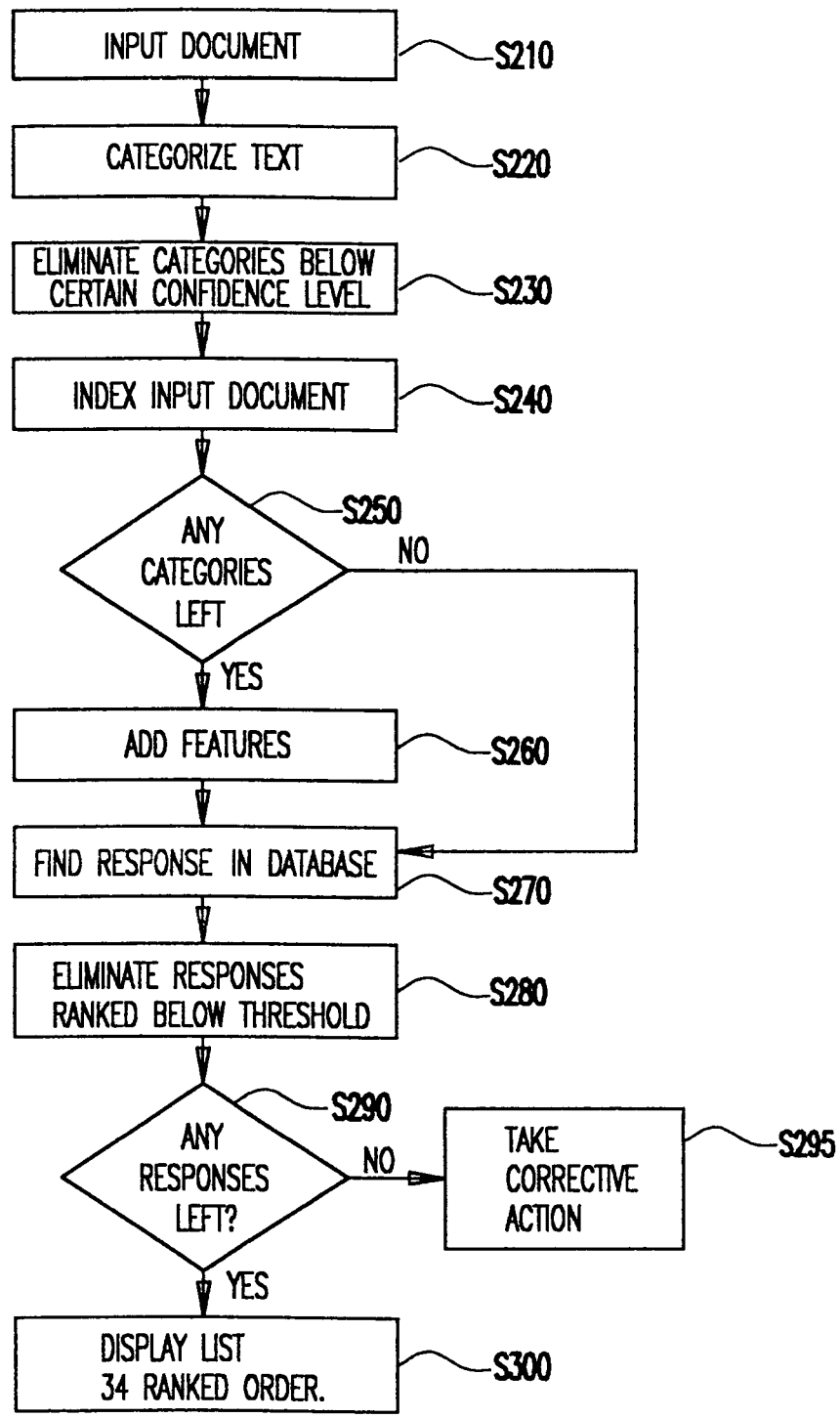
FIG. 4 is a flow diagram of an embodiment showing still further steps of implementing the two stage automated electronic messaging system of the present invention.
Figure 5:
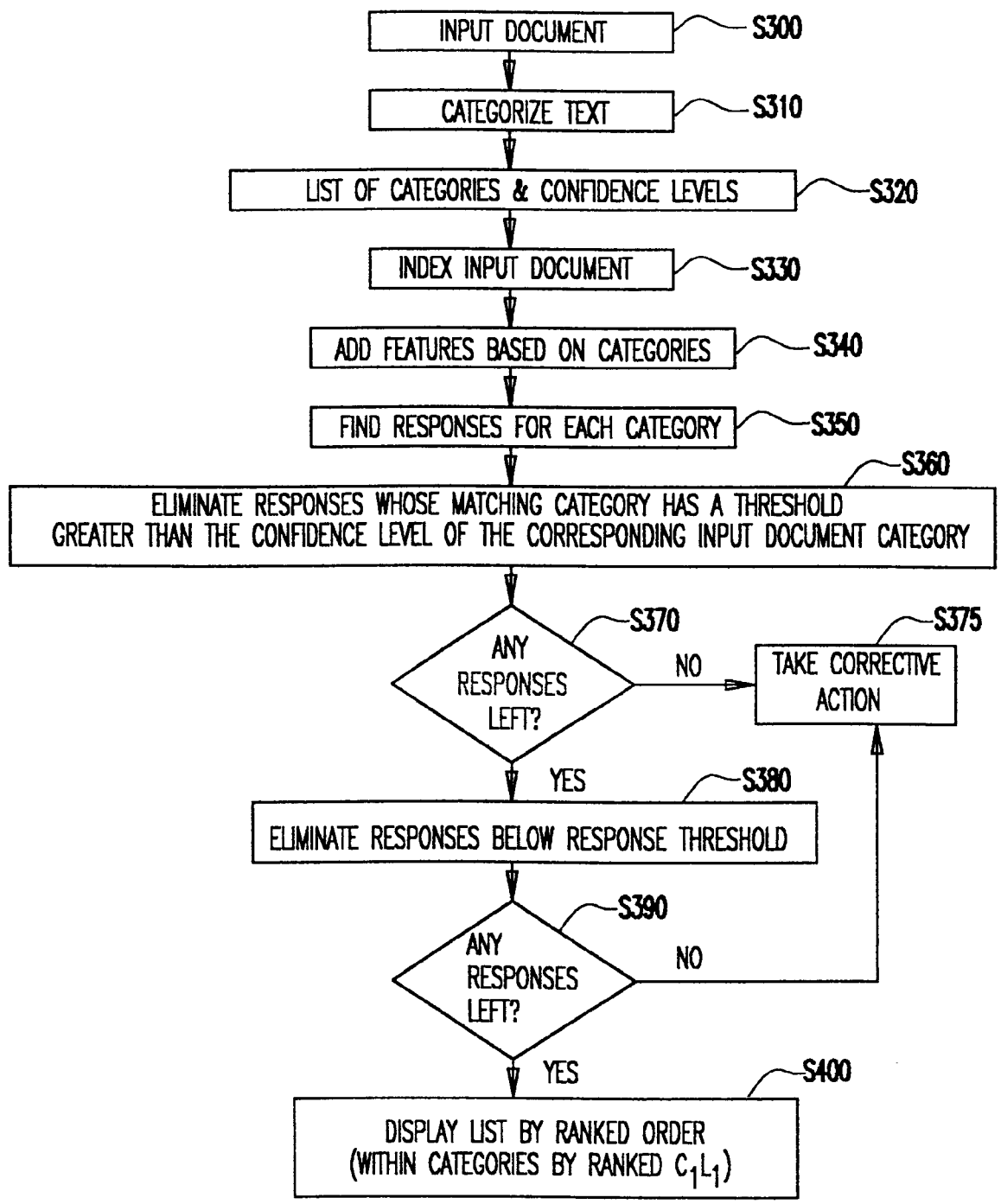
FIG. 5 is a flow diagram of an embodiment showing still further steps of implementing the two stage automated electronic messaging system of the present invention.

FIG. 2 shows a flow diagram depicting the steps of implementing the two stage automated electronic messaging system of the present invention. FIGS. 3–5 represent flow diagrams of embodiments of the present invention showing additional steps of implementing the two stage automated electronic messaging system. It should be understood that FIGS. 2–5 may equally represent a high level block diagram of a two stage automated electronic messaging system which implements the steps of the flow diagram now depicted in FIGS. 2–4.

Referring now to FIG. 2, in step S10, a user inputs an input document into the system of the present invention. The input document may be provided via the Internet, an intranet, LAN or other similar systems. In step S20, the categorizer receives the input document and classifies the "input document" into zero, one or more categories and, in embodiments, associated confidence levels based on the input document. In step S30, the example based response generator searches only the specified categories in the document response database (or other database) and provides zero, one or more responses to the input document. In step S40, the response is optionally ranked using any well known ranking system, such as, for example, weighting words, terms or phrases. In step S50, the ranked responses are displayed by category, via a web browser, display browser, help desk, email and the like. It is well understood that the present invention would work equally well without ranking the responses, and may not list any categories (but only responses retrieved by the example based response generator).

FIG. 3 shows an embodiment of the present invention which implements a document indexing system. In step S110, a user inputs an input document into the system of the present invention. In step S120, the categorizer receives the input document and classifies the it categories and, in embodiments, associated confidence levels. It should be noted that the use of confidence levels may not be required by the present invention; however, the use of the confidence levels may provide more accurate responses to the input document.

Still referring to FIG. 3, in step S130, the category (or categories) and associated confidence levels are provided, and optionally displayed. In step S140, the input document is indexed in order to provide those features which are important for searching purposes. This indexing includes, for example, weighting a certain feature so as to "bias" the search to only those features such as words, phrases and the like which are important to the specific search. In step S150, the example based response generator finds documents (using the indexing) in a document response database (or other database) and ranks the response using any well known ranking system, as discussed above. In step S160, the ranked responses are displayed by category, via a web browser, display browser, help desk, email and the like. It is well understood that steps S130 and S140 are not necessarily needed by the present invention, and that the present invention would work well without indexing the request or ranking the responses. However, it is further understood that such an implementation of indexing and ranking may provide more accurate responses to the input document.

FIG. 4 is an embodiment of the present invention which implements the use of a threshold confidence level in addition to a document indexing system. In step S210, a user inputs an input document into the system of the present invention. In step S220, the categorizer receives the input document and classifies the responses into categories and associated confidence levels based on the input document. In step S230, the method of the present invention eliminates all categories that are below a predetermined confidence level (as related to the response categories). In step S240, the input document is indexed in order to provide those features which are important for searching purposes. In step S250, a determination is made as to whether there are any categories that meet or exceed the predetermined confidence level. Step S250 may equally be performed before step S240. If there are categories that meet or exceed the predetermined confidence level, in step S260, the method of the present invention adds features with extra weight from rules assigning categories. If all of the categories are eliminated, then the example based response generator searches the entire document response database (or other database) and finds any relevant responses in the document response database (or other database) in step S270. Similarly, after step S260, the example based response generator will also find documents in a document response database (or other database) in step S270; however, only those documents that are in the specified and remaining categories will be searched by the example based response generator.

In step S280, all responses below a predetermined score (or rank) are eliminated. In step S290, a determination is made as to whether there are any responses that meet or exceed the predetermined score (or rank). If there are no responses that meet or exceed the predetermined score (or rank) than a corrective action is taken in step S295. This corrective action may simply be lowering the predetermined score (or rank) and repeating step S280, requesting the user to further refine the request, allowing the user to send the query to a person or to take some other appropriate action. If there are any responses that meet or exceed the predetermined score (or rank), in step S300, a list of the responses are sorted by score for each category and, similarly, each category is listed by confidence level (if more than one category is present).

FIG. 5 is still another embodiment of the present invention. In step S300, a user inputs an input document into the system of the present invention. In step S310, the categorizer receives the input document and classifies the responses into categories and associated confidence levels based on the input document. In step S320, the method of the present invention provides a list of the categories and confidence levels, in either ascending or descending order. In step S330, the input document is indexed in order to provide those features which are important for searching purposes. In step S340, features based on the categories are optionally added. In step S350, the method of the present invention finds responses for each of the categories of input documents.

In step S360 of FIG. 5, the method of the present invention eliminates all responses having matching categories that have a threshold greater than the confidence level of the corresponding input document(e.g., if the confidence level of the input document does not meet or exceed the confidence level of the categorized response, then the response may be eliminated). In step S370, a determination is made as to whether there are any responses remaining. If there are no responses remaining, then in step S375, a corrective action is taken, such as, for example, a request for further input documents. If there are responses remaining in the database, then in step S380, those responses that are below a response threshold are eliminated.

Still referring to FIG. 5, in step S390 a determination is made as to whether there are any responses remaining after step S380 is performed. If there are no responses remaining after step S390, then the corrective action is taken in step S375. If any responses remain after step S390, then the remaining responses are listed, preferably by ranked order within categories, in step S400. It is further preferred that the categories are also ranked according to the confidence level.

Example of Use of the Present Invention

Provided herein is one illustrative example of the use of the present invention with reference to FIG. 4. It should be understood that the following example does not in any manner whatsoever limit the scope of the present invention, and it should further be realized that there are many further examples that may equally be used with the present invention. For example, the example provided below may equally be used with the method as shown in FIG. 2 or 3, or variations thereof which are obvious to one of skill in the art.

Figure 6:
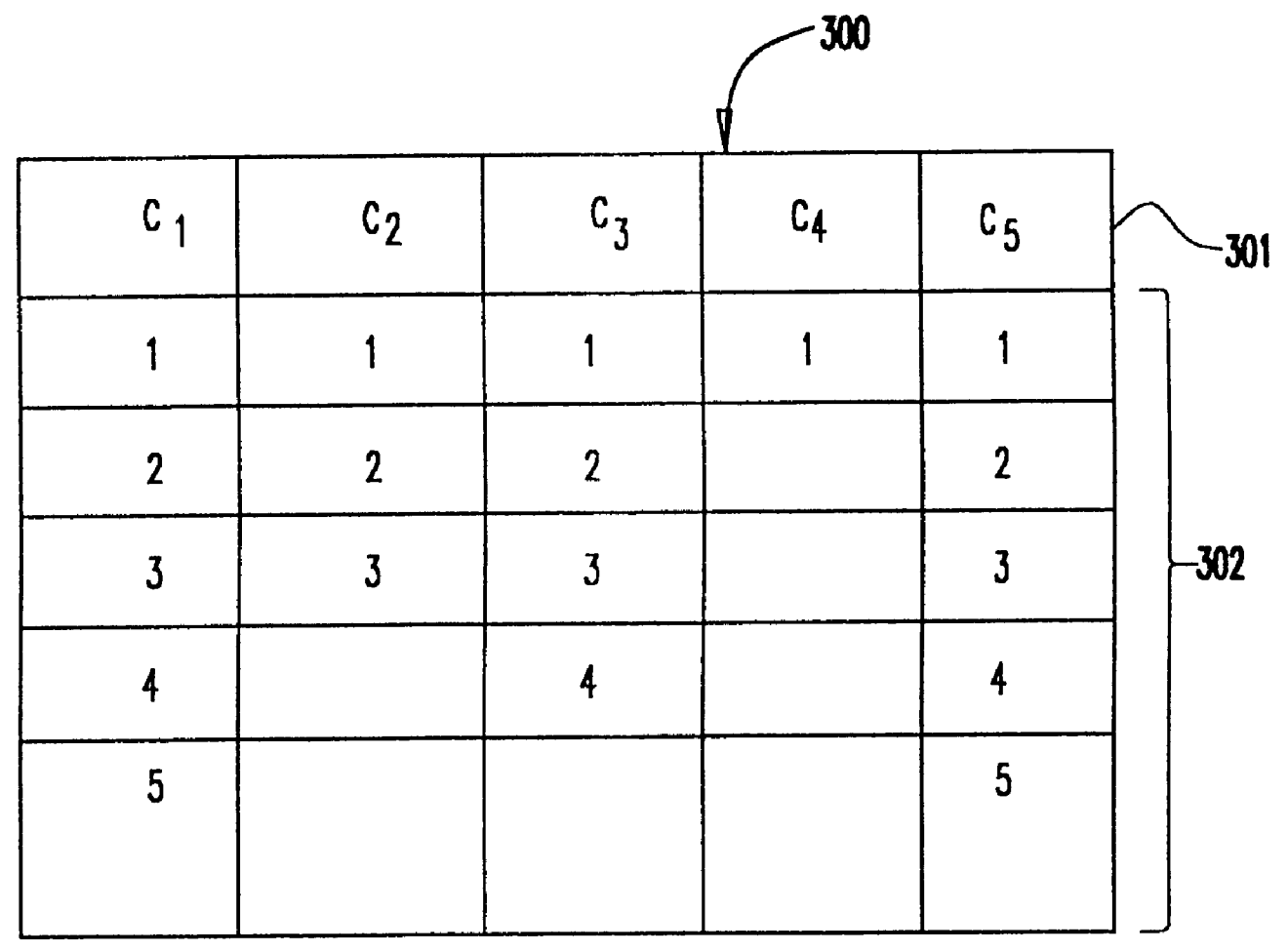

FIG. 6 shows a database 300 including data (documents/responses) residing therein. The documents are partitioned into more general, stable, data at a top row 301 and less general, unstable (i.e., change quickly overtime as new features are added or problems are fixed), data at lower rows 302. The documents residing in the lower rows 302 may be partitioned into even more specific, dynamic, data that comprises unique responses to the user input document. However, any row of partitioned data may be responsive to the user input document, depending on the specific user input document.

It is well understood by one of ordinary skill in the art that the database of FIG. 6 is but one example of a database used with the present invention, and such a database is not critical to the understanding of the invention in any manner whatsoever. It is thus well understood that the database of FIG. 6 is presented for illustrative purposes only, and that the system of the present invention can equally use any other database or dataset, depending on the particular application of the present invention.

Referring still to FIG. 6, a user inputs an input document into the system of the present invention. This input document is received by the categorizer 10, and classifies the input documents into categories and optionally confidence levels. The responses (e.g., documents residing in the database 300) are also preassigned categories and associated confidence levels. In the example present herein, the responses may be classified into "$C_1$", "$C_2$" and "$C_5$" as appropriate categories that may contain appropriate responses to the input document. These categories when assigned to the input document by the categorizer may also have certain confidence levels associated therewith such as, for example, "$C_1$" equals a 85% confidence level, "$C_2$" equals a 65% confidence level and "$C_5$" equals a 25% confidence level.

The method of the present invention then eliminates all categories that are below a predetermined confidence level, such as 50%. Thus, in the example presented herein, the category "$C_5$" would be eliminated. It is noted that the predetermined confidence level may be at 90% or another predetermined number, and that all of the categories may thus be eliminated. However, assuming that only "$C_5$" is eliminated, the input document is then indexed in order to provide those features which are important for searching purposes.

The system of the present invention then determines whether any categories are left which meet or exceed the predetermined confidence level, which in this example include categories "$C_1$" and "$C_2$". The method of the present invention then adds features with extra weight from rules assigning categories. If all of the categories are eliminated, then the example based response generator 20 finds appropriate documents in the entire database; however, if there are categories remaining, the example based response generator will only search those specified categories (e.g., "$C_1$" and "$C_2$"). In the example presented herein, the example based response generator determines that "$C_1 1$", "$C_1 2$", "$C_1 4$", "$C_2 2$" and "$C_2 4$" are appropriate responses.

The present invention also ranks the responses, for example, (i) "$C_1 1$" and "$C_1 2$" are ranked at a score of "55", (ii) "$C_1 4$" is ranked by a score of 90, (iii) "$C_2 2$" is ranked at a score of "65" and (iv) "$C_2 4$" is ranked at a score of "89". Thereafter, all documents below a predetermined score are eliminated. In the example provided, any score below "60" is eliminated, thus returning "$C_1 4$", "$C_2 2$" and "$C_2 4$" as potentially appropriate responses.

A list of the responses that meet or exceed the predetermined score (e.g.,"$C_1 4$", "$C_2 2$" and "$C_2 4$") are then sorted by score for each category and, similarly, each category is listed by confidence level (if more than one category is present). Thus, in the present example, the following list would be displayed, which includes the appropriate responses to the input document.

| | |
|---|---|
| "$C_1 4$" | "$C_2 2$" |
| | "$C_2 4$" |

Alternatively, the list may be provided in the following format.

| |
|---|
| "$C_1 4$" |
| "$C_2 2$" |
| "$C_2 4$" |

If there are no responses that meet or exceed the predetermined score than a corrective action is taken, such as, for example, lowering the predetermined score.

As seen above, by using the method of the present invention, the example based response generator 20 is restricted to searching smaller, more focused parts of the entire dataset. This technique of the present invention thus increases the odds of finding correct and responsive answers to the user's input document. Also, by using the present invention, the database may be more dynamic, e.g., changing, adding or deleting data, without any concern to training on data being presented therein.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of providing responses to a user input document comprising the steps of:
classifying the user input document into zero, one or more user input document categories, wherein the classifying step includes analyzing the user input document by (i) tokenization, (ii) morphological analysis or (iii) text processing techniques;
searching a response database within a predetermined one or more categories associated with the user input document in order to obtain zero, one or more responses to the user input document when the classifying step classifies the user input document into one or more user input document categories; and
providing zero, one or more response based on the searching step, the zero response being provided when one of zero categories are classified in the classifying step and zero responses are obtained in the searching step, and the one or more response being provided when the searching step obtains one or more responses.

2. The method of claim 1, wherein the one or more response is associated with at least one of the predetermined one or more categories.

3. The method of claim 1, wherein the more response is at least two responses, the at least two responses being associated with at least one of the predetermined one or more categories.

4. The method of claim 1, further providing response database confidence levels associated with the predetermined one or more categories and user input document confidence levels associated with the user input document one or more categories.

5. The method of claim 4, further comprising eliminating at least one or more responses associated with the predetermined one or more categories whose confidence levels exceed the user input document confidence levels.

6. The method of claim 4, wherein the searching step only searches categories whose confidence levels do not exceed the user input document confidence levels.

7. The method of claim 4, wherein the classifying step and providing confidence level step is performed by a machine-learning based categorizer.

8. The method of claim 1, wherein the searching step includes similarity matching techniques or keyword searching.

9. The method of claim 1, wherein the predetermined one or more categories are a subset of an entire dataset of the database.

10. The method of claim 1, further comprising adding or changing data in the database without training on the data.

11. The method of claim 10, wherein the searching step searches the added or changed data within the database.

12. The method of 10, wherein prior to the classifying step, data is trained on in order to provide an accurate categorizer which assigns categories to the user input document.

13. The method of claim 1, further comprising ranking or scoring the one or more response, wherein the ranking or scoring assists a user in finding a most accurate of the one or more response.

14. The method of claim 13, wherein the ranking or scoring is based on at least a (i) number of word or stem matches or (ii) a weighting of a word, stems, phrases or (iii) nearest neighbor distance measure.

15. The method of claim 13, further comprising displaying the zero, one or more response in order of the ranking or scoring.

16. The method of claim 13, wherein the zero, one or more response is ranked according to a predetermined ranking scheme.

17. The method of claim 16, wherein the providing step includes displaying the zero, one or more response in order of rank.

18. The method of claim 1, wherein the providing step includes displaying the zero, one or more response.

19. The method of claim 18, wherein the displaying step includes at least displaying the zero, one or more response via a web browser, a display browser, a help desk or an email.

20. The method of claim 1, wherein when there are no predetermined one or more categories associated with the user input document, the searching step searches all potential responses residing on the response database.

21. The method of claim 1, further comprising indexing the user input document.

22. The method of claim 1, wherein one of the one or more response is a request to provide further user input documents.

23. The method of claim 1, wherein the predetermined one or more categories are high level general information associated with the user input document.

24. The method of claim 1, wherein the zero, one or more response is specific information associated with the user input document, the zero, one or more response being more specific than the predetermined one or more categories.

25. The method of claim 1, further comprising sending the document via the Internet, intranet, LAN, or other network system in order for the classifying step to classify the potential responses.

26. A method of providing responses to a user input document comprising the steps of:
classifying user input documents into zero, one or more user input categories, wherein the classifying step includes analyzing the user input document by (i) tokenization, (ii) morphological analysis or (iii) text processing techniques;

providing confidence levels associated with the one or more input categories, wherein the confidence levels are provided when said classifying step classifies the user input documents into one or more user input categories;

searching a database within one or more predetermined categories whose confidence levels do not exceed the confidence levels of the one or more user input categories in order to obtain zero, one or more responses to the user input document when the classifying step classifies the user input document into one or more user input categories; and displaying at least zero, one or more response, the zero response being displayed when one of said classifying step classifies the user input documents into zero user input categories and said searching step obtains zero responses, and the one or more response being displayed when said searching step obtains one or more responses.

27. The method of claim 26, further comprising eliminating the one or more predetermined categories whose confidence levels are above the confidence levels of the one or more user input categories.

28. The method of claim 27, wherein the searching step only searches predetermined categories whose confidence levels do not exceed the confidence levels of the one or more input document categories.

29. The method of claim 26, wherein the one or more response is associated with at least one of the one or more user input categories.

30. The method of claim 26, wherein when no categories are assigned, the searching step searches all responses residing on the database.

31. The method of claim 26, further comprising indexing the user input document.

32. The method of claim 26, further comprising scoring or ranking the zero, one or more response in order to provide in rank order the zero, one or more response.

33. The method of claim 32, further comprising eliminating at least one of the zero, one or more response which are below a predetermined ranking or scoring.

34. The method of claim 33, further providing a corrective action when the zero, one or more response falls below the predetermined ranking or scoring.

35. The method of claim 34, wherein the corrective action includes lowering the predetermined scoring or ranking or requesting more user input documents.

36. The method of claim 33, further comprising displaying the zero, one or more response that meets or exceeds the predetermined scoring or ranking.

37. A means for providing responses to a user input document comprising:

means for classifying user input document into zero, one or more user input categories, wherein the classifying step includes analyzing the user input document by (i) tokenization, (ii) morphological analysis or (iii) text processing techniques;

means for searching a response database within one or more predetermined categories in order to obtain zero, one or more responses to the user input document when said means for classifying classifies the user input document into one or more user input categories; and means for providing the zero, one or more response, the means for providing the zero response when one of the means for classifying classifies the user input document into zero user input categories and the means for searching obtains zero response, and the means for providing providing the one or more response when the means for searching obtains one or more responses.

38. The means for providing responses of claim 37, further comprising means for providing a confidence level associated with the one or more user input categories.

39. The means for providing responses of claim 37, wherein the means for classifying is a machine-learning based categorizer.

40. The means for providing responses of claim 37, wherein the means for searching includes similarity matching techniques or keyword searching.

41. The means for providing responses of claim 37, further comprising means for ranking or scoring the at least one or more response, wherein the ranking or scoring assists a user in finding a most accurate of the at least one or more response.

42. The means for providing responses of claim 41, further comprising means for displaying the at least one or more response.

43. A computer program product comprising:

a computer usable medium having computer readable program code embodied in the medium for query-object synthesis/modification, the computer program product having:

first computer program code for classifying input documents into zero, one or more categories, wherein the classifying includes analyzing the user input document by (i) tokenization, (ii) morphological analysis or (iii) text processing techniques;

second computer program code for searching a response database within one or more database categories in order to obtain zero, one or more responses to the user input document when said first computer program code classifies the input documents into one or more categories; and third computer program code for providing the zero, one or more response, the zero response being provided when one of said first computer program code classifies the input documents into zero categories and said second computer program code obtains zero response, and the one or more response being provided when said second computer program code obtains one or more responses.

* * * * *